United States Patent [19]
Partus et al.

[11] Patent Number: 5,692,087
[45] Date of Patent: Nov. 25, 1997

[54] OPTICAL FIBER WITH LOW OH IMPURITY AND COMMUNICATION SYSTEM USING THE OPTICAL FIBER

[75] Inventors: Fred Paul Partus, Atlanta, Ga.; Gordon Albert Thomas, Princeton, N.J.; Robert Michael Atkins, Millington, N.J.; James William Fleming, Jr., Westfield, N.J.

[73] Assignee: Lucent Technologies Inc., Murray Hill, N.J.

[21] Appl. No.: 403,044

[22] Filed: Mar. 13, 1995

Related U.S. Application Data

[63] Continuation of Ser. No. 159,179, Nov. 30, 1993, Pat. No. 5,397,372.

[51] Int. Cl.$^6$ ......................................... G02B 6/16
[52] U.S. Cl. .................. 385/123; 385/125; 385/126; 372/6; 65/391; 65/399
[58] Field of Search .......................... 385/123–128; 65/391, 399, 419, 429, 430, 435; 359/341; 372/6

[56] References Cited

U.S. PATENT DOCUMENTS

| | | | |
|---|---|---|---|
| 4,334,903 | 6/1982 | MacChesney et al. | 65/3.12 |
| 4,419,116 | 12/1983 | Nakahara et al. | 65/3.12 |
| 4,707,173 | 11/1987 | Kawazoe et al. | 65/3.12 |
| 5,000,771 | 3/1991 | Fleming, Jr. et al. | 65/2 |
| 5,106,402 | 4/1992 | Geittner et al. | 385/127 X |
| 5,318,612 | 6/1994 | Le Noane et al. | 65/3.12 |
| 5,373,576 | 12/1994 | Minns et al. | 385/127 X |

FOREIGN PATENT DOCUMENTS

| | | |
|---|---|---|
| 0 091 173 | 10/1983 | European Pat. Off. . |
| 0 140 113 | 5/1985 | European Pat. Off. . |
| 0 519 834 A1 | 12/1992 | European Pat. Off. ............. 385/3.12 |

OTHER PUBLICATIONS

D.P. Jablonowski et al., "Optical Fiber Manufacturing Techniques", *AT&T Technical Journal*, vol. 66, No. 1, pp. 33–44 (1987). Jan.–Feb. 1987.

Th. Hunlich et al., "Fiber–Preform Fabrication Using Plasma Technology: A Review", *Journal of Optical Communications*, vol. 8, No. 4, pp. 122–129 (1987). No Month.

Y. Hassler, "A Homogeneous Heating Technique In Perform Manufacturing", *Journal of Lightwave Technology*, vol. LT–4, No. 10, pp. 1567–1570 (1986). Oct.

*Primary Examiner*—Phan T.H. Palmer

[57] ABSTRACT

An optical fiber formed from a glass preform substantially free of OH impurities is disclosed. The optical fiber is made to be free of OH impurities by a method having the steps of introducing a moving stream of vapor mixture including at least one compound glass-forming precursor together with an oxidizing medium into a tube, while generating a hydrogen-fee isothermal plasma on an outer surface of the tube to react the mixture and produce a glassy deposit on an inner surface of the tube. The glass preform is drawn to produce the optical fiber.

9 Claims, 3 Drawing Sheets

OPTICAL FIBER WITH LOW OH IMPURITY AND COMMUNICATION SYSTEM USING THE OPTICAL FIBER

This application is a continuation of application No. 08/159,179, filed Nov. 30, 1993, (status: allowed) now U.S. Pat. No. 5,397,372.

BACKGROUND OF THE INVENTION

1. Field of the Invention

The invention generally relates to the field of optical fibers, and more particularly, to making optical fiber preforms from which optical fibers are drawn.

2. Related Art

The widespread use of optical fibers (lightguides) in telecommunications, medicine, and metrology can, in general, be directly related to the advent of low-loss glass fibers. Though some loss is inherent, low loss fibers result from reducing the loss mechanisms incorporated in the fiber during manufacture. These mechanisms include, among others, impurities that act as light absorbers, and geometrical distortions that lead to scattering of light inside the fiber.

Additionally, widespread deployment of low loss optical fibers has generally required that fibers possess the material strength to withstand placement in harsh environments. This has been facilitated by reducing structural faults, such as bubbles or chemical impurities, that can cause significant mechanical stress and weakening of the fiber and/or can cause added loss. Typically, the loss mechanisms and structural faults in an optical fiber drawn from a glass preform result from these imperfections existing in the glass preform. Thus, to manufacture high strength, low loss glass fibers efficiently, techniques must be employed that reduce the loss mechanisms and structural faults present in the glass preform.

When loss mechanisms and structural faults result from preform surface imperfections, they can be substantially eliminated by removing surface material comprising the imperfection (this removal process being referred to as an etching process). Etching techniques, such as mechanical milling, chemical etching and plasma etching, are available that can be applied to glass preforms.

Conventional chemical etching is relatively slow and is typically not a clean process. Though some imperfections are removed by chemical reaction, different imperfections can be incorporated as a byproduct of the etching reaction. In addition, chemical etching is typically preferential, which is generally not suitable for selectively removing preform surface material.

Mechanical milling is adaptable to the normal processing environment, but can introduce mechanical stress into the glass preform, and can lead to preform structural failure (e.g., formation of cracks that can propagate through the perform).

Imperfections can also be removed quickly and cleanly by contacting the preform surface with an electrically conducting plasma region (a plasma fireball) using a isothermal plasma torch. The surface material is substantially removed by vaporization, due to the extremely high plasma temperature (>9000° C. at the plasma fireball center) of the isothermal plasma torch. Though the temperatures in the tail of the plasma fireball are substantially less than at the plasma center, the temperatures are generally still several thousand degrees centigrade. These tail temperatures typically are sufficiently high to cause vaporization of most refractory dielectrics, thus removing impurities from the surface of the preform as well. Such impurities include, but are not limited to, OH-type impurities, particularly water. OH-type impurities are the result of hydrogen reacting with oxygen during the deposition. The source of hydrogen comes from precursor chemicals, the starting tube or hydrogen diffusion into the preform from the heat source.

Although the above methods are sufficient for removing impurities and imperfections from the outer surface of the preform, there still remains the problem of impurities in the inner portion of the preform that are not the result of impure chemicals. Thus, what is desired is a method for making optical fiber preforms that substantially eliminates hydrogen from the deposition process to avoid OH-type impurities in the resulting optical fiber product.

SUMMARY OF THE INVENTION

The present invention is directed to a method for making optical fiber preforms using a hydrogen-free heat source. The method comprises the steps of introducing a moving stream of a vapor mixture including at least one compound glass-forming precursor together with an oxidizing medium into a tube while generating a hydrogen-free isothermal plasma on an outer surface of the tube, whereby the mixture reacts and a glassy deposit is produced on an inner surface of the tube.

The method of the invention is based on the Modified Chemical Vapor Deposition (MCVD) process developed by AT&T Bell Laboratories. The inventors have replaced the oxyhydrogen heat source conventionally used in the MCVD process with a hydrogen-free plasma torch. Using a hydrogen-free plasma torch eliminates the introduction of hydrogen by the heat source. Eliminating hydrogen from the process in this manner minimizes the formation of water in the preform during the MCVD process. Thus, according to the present invention, OH-type impurities are minimized in the resulting optical fiber product.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings in which.

In the figures like reference numbers indicate identical or functionally similar features. Also in the figures, the leftmost digit of each reference number corresponds to the figure in which the reference number is first used. No attempt has been made to depict true dimensions and/or proportions.

DETAILED DESCRIPTION OF THE PREFERRED EMBODIMENTS

The preferred embodiment of the present invention will now be discussed in detail. While specific features, configurations and arrangements are discussed, it should be understood that this is done for illustrative purposes only. A person skilled in the relevant art will recognize that other steps, configurations and arrangements can be used without departing from the spirit and scope of the invention.

Further, background material concerning semiconductor solid-state physics can be found in a number of references including two books by S. M. Sze, titled: *Physics of Semiconductor Devices*, John Wiley and Sons, Inc., New York (1981), and *Semiconductor Devices, Physics and Technology*, John Wiley and Sons, Inc., New York (1985), both of which are incorporated herein by reference. A discussion of modified chemical vapor deposition (MCVD) is in Chapter 10-2-3 of a text titled, *Optical Fiber Communications*, by Gerd Keiser, McGraw-Hill (1983). This text is also incorporated herein by reference.

The inventors have discovered an improved method for making optical fiber preforms using a hydrogen-free heat source. The MCVD process of the present invention is essentially the same as that described in U.S. Pat. No. 4,334,903 (hereafter referred to as the '903 patent); however, the inventors have replaced the oxyhydrogen burner disclosed in the '903 patent with a hydrogen-free, isothermal plasma torch. Using an oxygen plasma torch, for example, in the MCVD process eliminates the introduction of hydrogen by the heat source. Eliminating hydrogen from the process in this manner minimizes the formation of OH in the preform. Thus, according to the present invention, OH-type impurities are minimized in the resulting optical fiber product.

The preferred oxygen plasma torch implemented in the method of the present invention is disclosed in U.S. Pat. No. 5,000,771 (hereafter referred to as the '771 patent). Both the '771 and '903 patents are incorporated herein by reference.

Figure 1:
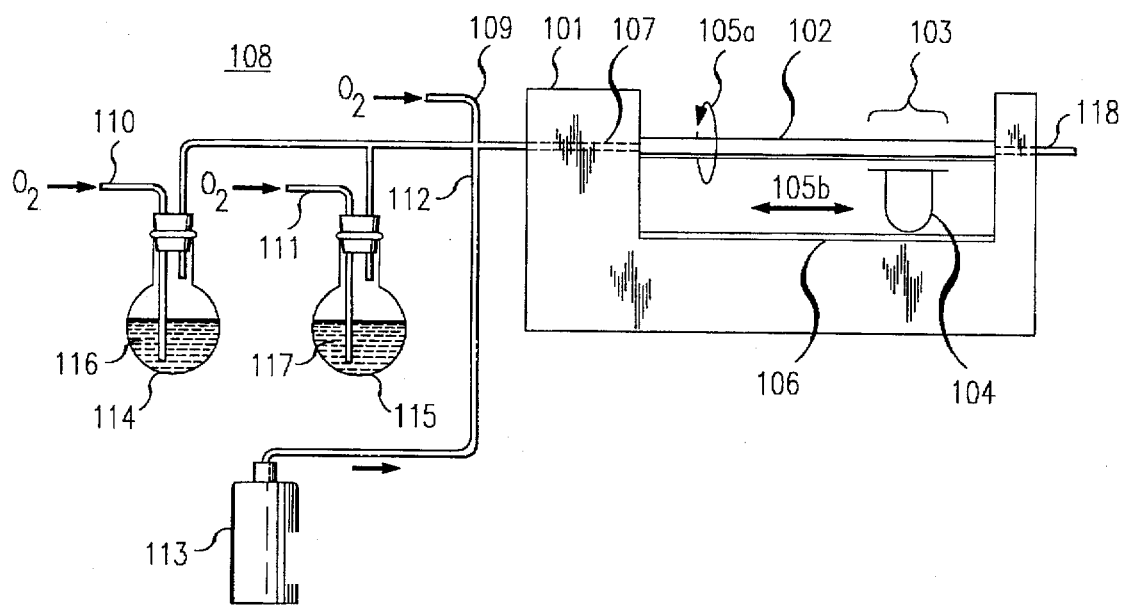
FIG. 1 shows a front elevation view of apparatus for a deposition process using a hydrogen-free torch according to the present invention.

Turning now to the description of an apparatus used to implement the method of the invention, FIG. 1 depicts a lathe 101 holding substrate tube 102 within which a hot zone 103 is produced by heating means 104. According to the method of the invention, the heating means 104 is an isothermal plasma torch having an oxygen discharge gas source, as will be discussed below. Tube 102 may be rotated, for example, in the direction shown by arrow 105a by means not shown and hot zone 103 is caused to traverse tube 102 by movement of heating means 104 as schematically depicted by double headed arrow 105b, for example, by a threaded feed member 106. A vapor-gaseous material is introduced into tube 102 via inlet tube 107 which is, in turn, connected to source material reservoir 108. Such reservoirs may include an oxygen inlet 109 connected to means not shown. As depicted, gaseous material may also be introduced by inlets 110 and 111 by means not shown and through inlet 112 from reservoir 113. Reservoirs 114 and 115 contain normally liquid reactant material which is introduced into tube 102 by means of carrier gas introduced through inlets 110 and 111 with the arrangement being such that the carrier gas is bubbled through such liquids 116 and 117. Exiting material is exhausted through outlet 118. Not shown is the arrangement of mixing valves and shut off valves which may be utilized to meter flows and to make other necessary adjustments in composition. The apparatus of FIG. 1 is generally horizontally disposed.

Figure 2:
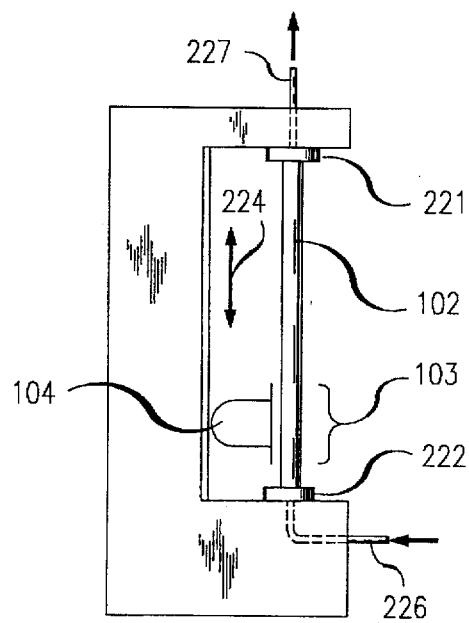
FIG. 2 shows a portion of the apparatus of FIG. 1 in a vertical position.

The apparatus of FIG. 2 is, in its operational characteristic, quite similar to that of FIG. 1. Vertical disposition of the substrate tube, however, lends stability to the portion of the tube within the hot zone and may permit attainment of higher temperature or of longer hot zones in the traversal direction without objectionable distortion. Apparatus depicted includes the substrate tube 102 which may optionally be provided with rotation means not shown. This tube is secured to the apparatus by means of chucks 221 and 222 and a traversing hot zone is produced within substrate tube 102 by heating means 104 which is caused to constantly traverse substrate tube 102 in the direction depicted by double headed arrow 224 by heating means 104. Gaseous material, for example, from source such as 108 of FIG. 1 is introduced via inlet tube 226 and existing material leaves via exhaust 227.

Figure 3:
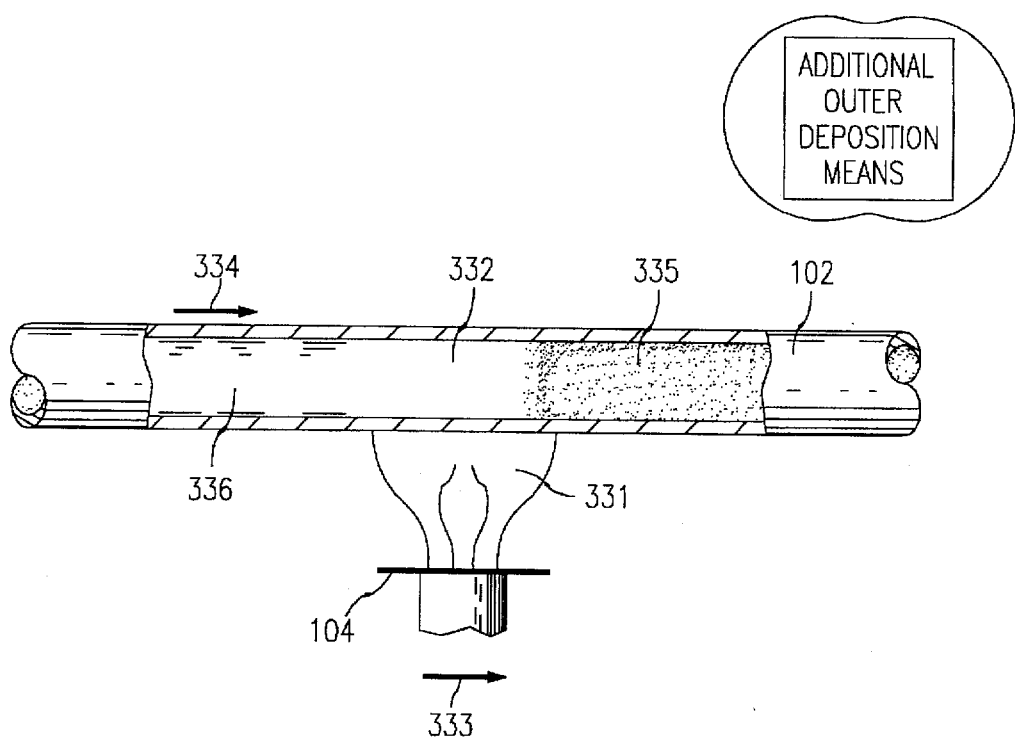
FIG. 3 is a sectional view of a substrate tube depicting observed conditions during processing.

FIG. 3 is a front elevational view of a section of the substrate tube 102 as observed during deposition. Depicted is a heating means 104 producing a plasma fireball 331 which is traversing the substrate tube 102 in the direction shown by an arrow 333 by means not shown. Vapor-gaseous material is introduced at the left end of substrate tube 102 and flows in the broken section of the figure in the direction shown by an arrow 334. A zone 335, downstream of a hot zone 332, is filled with a moving powdery suspension of particulate oxidic material, while a region 336, generally devoid of such particulate matter, defines the region within which fusion of deposited material is occurring.

Figure 4:
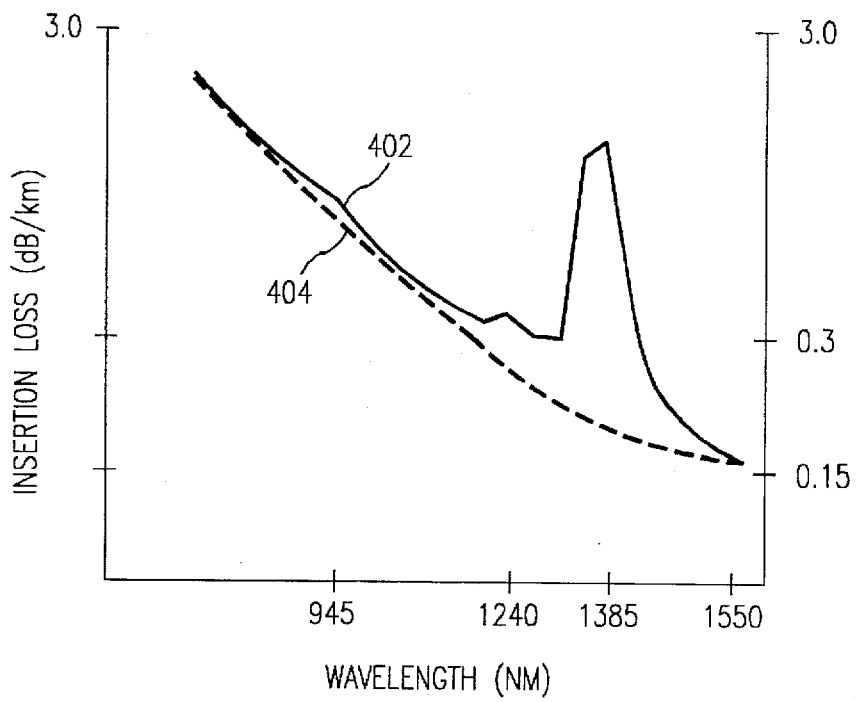
FIG. 4 shows a plot of the relationship of insertion loss (dB/kilometer) vs. wavelength (nanometers) for a conventional clad multimode fiber (solid line) and a clad multimode fiber made according to the present invention (dashed line).

FIG. 4 shows a first plot 402 (solid line) for measured loss in units of decibels per kilometer (dB/km) as measured on an optical fiber prepared in accordance with the '903 patent. Abscissa units are wavelength in nanometers. It is seen that loss is at a minimum of about 0.15 dB/km for the wavelength range of around 1550 nm (the limiting value on the plot). The peak at about 1385 nm, as well as those at 1240 and 945 nm, are characteristic subharmonics of the fundamental water absorption.

FIG. 4 also shows a plot 404 (dashed line) that depicts measured loss expected for a length of optical fiber drawn from a preform made according to the present invention. It is seen that the sub-harmonics of the fundamental OH absorption are virtually eliminated, because hydrogen is prevented from diffusing into the substrate tube while the preform is made.

Reaction Temperature

Superficially, the inventive technique resembles conventional chemical vapor deposition. In general, 50% or more of reaction product is produced in a position removed from substrate surface and results in the formation of solid oxidic particles of the desired glass composition.

Homogeneous reaction is the result of sufficient rate of reactant introduction and sufficient reaction temperature. Such conditions can be achieved simply by increasing one or both parameters until homogeneous reaction is visually observed. To optimize the process from the standpoint of reaction, high temperatures are utilized. For the usual silica based systems, which comprise the preferred embodiment, temperatures at least at the inner substrate wall are generally maintained at a minimum of 1200 degrees C. at the moving position corresponding with the hot zone. Maximum temperatures are ultimately limited by significant wall distortion. For horizontally disposed apparatus, such as that shown in FIG. 1, in which a hot zone moves at the rate of about 2–20 cm/min about a tube rotated at the rate of about 100 rpm, at temperatures greater than 1800 degrees C. may be produced without harmful tube distortion. Decreasing the length of the hot zone, increasing the rate of rotation, increasing reactant flow rate, and vertical disposition of the tube are all factors that can permit use of higher maximum temperatures without variation in tube geometry. Indicated temperatures are those measured by means of an optical pyrometer focused at the outer tube surface. It has been estimated that for typical conditions the thermal gradient across the tube may be as high as 300 degrees C.

Reactants

Examples were carried out using chlorides and hydrides. Other gaseous materials of sufficient vapor pressure under the processing conditions and that react with oxygen or oxygen bearing material to produce the required oxidic glass may be substituted. In a typical system, the substrate tube is silica. The first reactant introduced may be such as results in the formation of a first layer of undoped silica or silica doped with an oxide which serves to change the refractive index, which acts as a part of the clad and presents a barrier to diffusing impurity from the tube. Subsequent to formation of the first barrier layer or absent such procedure, where the tube is of sufficient purity, reactant materials of such a nature as to result in the desired index-increased core are introduced. In a chloride system, these may take the form of a mixture of $SiCl_4$ together with, for example, $GeCl_4$ and oxygen. Chlorides of other index increasing materials, such as phosphorous, titanium, and aluminum may be substituted for $GeCl_4$ or admixed. $POCl_3$ can also be included to facilitate glass formation because of lowered fusion temperature, $BCl_3$ or freon for refractive index lowering, and the initial mixture may be altered during successive hot zone traversals so as to increase index (by increasing $GeCl_4$ or other index-increasing dopant precursor or by decreasing $BCl_3$ and freon).

Since the usual vapor phase glass precursor compounds are not oxidic, oxygen or a suitable oxygen bearing compound is generally included to form the ultimate oxidic glass. A satisfactory procedure, followed in exemplary procedures, takes the form of an oxygen stream bubbled through reservoirs of liquid phase glass forming compounds. In one procedure, for example, oxygen streams were bubbled through silicon tetrachloride, and through germanium tetrachloride. These streams were then combined with additional oxygen, the resultant mixture being introduced into the reaction chamber.

Relative amounts of glass forming ingredients are dependent upon a variety of factors, such as vapor pressure, temperature, flow rate, desired index, etc. The appended examples indicate suitable amounts for producing the noted indices under the noted conditions. Variants are known to those familiar with glass forming procedures.

A variety of diluent materials can be utilized for any of the noted reasons so, for example, argon, nitrogen, helium, etc., may serve to maintain desired flow rates. Oxygen bearing compounds which may replace oxygen in whole or in part include $N_2O$, $NO$, and $CO_2$, and the like.

In general, concentration of 3d-transition metal impurities in the gas stream is kept below $10^{-2}$ percent, although further reduction in loss accompanies reduction of those impurities down to the part per billion range. Such levels are readily available from commercial sources or by purification by means similar to those taught by H. C. Theuerer, U.S. Pat. No. 3,071,444. As compared with the usual soot process, the inventive procedure is carried out in a controlled environment without direct exposure to combustion products. This inherently results in avoidance of inclusion of particulate combustion products. Using a hydrogen-free heat source minimizes hydration from combustion in the soot process. This is a particularly significant advantage of the present invention over the prior art. As noted above in connection with prior art preform processes, several portions of the infrared spectrum suffer from sub-harmonics of the fundamental OH absorption. These sub-harmonics are reduced substantially according to the present method. For example, water peaks at 1385 nm can be less than 0.4 dB/km.

General Procedure

Deposition was carried out within a 19 I.D. by 25 O.D. mm silica tube. The tube was placed on a glass lathe within which it was rotated at 100 rpm. Before introduction of reactants, it was flushed with a continuous stream of oxygen while traversing with a hydrogen-free oxygen plasma torch sufficient to bring the wall temperature to 1700 degrees C. The purpose was to remove any volatile impurities on the inside wall of the tube.

Following a mixture of oxygen, $SiCl_4$, and freon was added to the oxygen flow. Temperature was maintained at 1700 degrees C. (within the moving hot zone as measured at the wall). In this particular example, the zone was moved at a speed of approximately 10 cm/min in the forward direction (direction of gas flow) and was rapidly returned to its initial position.

Formation of sooty material within the tube, at a position spaced from the wall generally downstream of the hot zone, was visually observed. It was deduced and verified that homogeneous reactant was largely within the zone with particulates being carried downstream by the moving gas. Deposition was continued for approximately four hours.

The procedure to this point results in deposition of a layer serving as cladding. Core material was next deposited by introduction of $SiCl_4$ and $GeCl_4$. These reactants, too, were introduced with an oxygen carrier, as before. With the temperature of the hot zone decreased somewhat to about 1600 degrees C., deposition was continued for a few hours or more.

In this particular example, tube collapse was initiated with $CCl_4$ and $O_2$ still flowing simply by reducing the rate of traverse of the hot zone. This results in a temperature increase which ultimately attained a level of greater than about 2000 degrees C. to produce nearly complete collapse. Reactant flow was then stopped with final collapse producing a finished preform consisting of a $GeO_2$—$SiO_2$ core with a fluorine doped cladding supported, in turn, by a silica layer. It will be recognized by those skilled in the art of fiber drawing, that the tube, without first being collapsed, can also be drawn into acceptable fiber. The resulting preform was then drawn, resulting in a fiber having an overall diameter of approximately 110 μm with a core area defined as the region within the down doped layer. The length of fiber drawn was approximately 0.7 km. The method described in some detail in N. S. Kapany, *Fiber Optics Principles and Applications* (Academic Press, New York) (1967) pages 110–117, involved the local heating of an end of the preform affixed to the fiber, which was, in turn, drawn at a constant velocity of approximately 60 meters/min by winding on a 15 cm reel.

Hydrogen-free Heat Source

As noted above, the smooth curve 404 of FIG. 4 is due to the elimination of water (i.e., OH impurities) in the resulting optical fiber. Formation of water in the preform during deposition is prevented since there is no source of hydrogen to diffuse through the substrate tube and react with oxygen in the flow.

Figure 5:
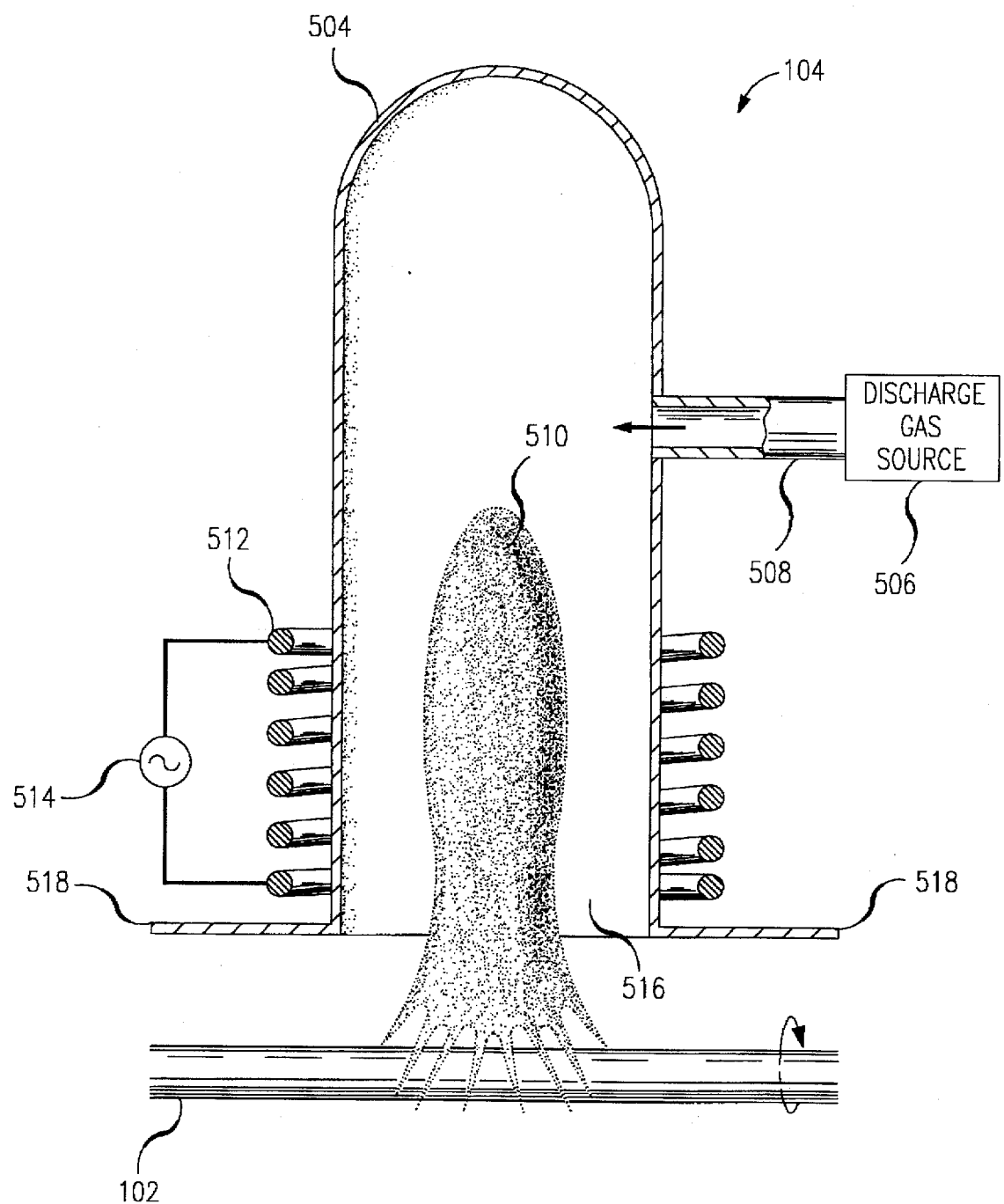
FIG. 5 schematically depicts an exemplary plasma torch maintaining the plasma in a plasma confinement region according to the present invention.

FIG. 5 schematically depicts an exemplary hydrogen-free heat source according to the present invention. Heat source 104 is a plasma torch comprising a fused silica mantle 504 connected to a gas source 506 by a tube 508. The gas source 506 delivers the desired gas used for the plasma discharge into the mantle 504. A plasma fireball 510 is excited by an RF coil 512 and an RF generator 514 (collectively referred to as an RF source). In a typical prior art plasma torch, gas sources are generally used to provide an ionizable gas, with the plasma fireball primarily contained in a confinement region 516 of the torch.

However, a substantial portion of the plasma fireball 510 can be pushed out of the confinement region 516 by adding, to the ionizable discharge gas, a high ionization threshold gas. The additional gas creates an area in the upper portion of the confinement region where higher energy is needed to couple RF energy into the gases to form a plasma. However, a plasma will naturally form at locations where the resistance to formation is generally lowest (i.e., the location where the energy requirements are generally lowest). In essence, the high threshold gas moves a significant portion of the optimal region for plasma formation out of the confinement region 516. The portion of the fireball outside the torch is typically less than 50% of the fireball, since maintaining a stable plasma generally requires the plasma center to remain in the torch for sufficient energy to couple into the plasma from the RF source. The '903 patent further describes the high ionization threshold gas embodiment.

Additionally, operation with the fireball extended outside the torch by approximately 30% to 50% of its volume generally places greater requirements on the power requirements of the RF source. However, by pushing the plasma center towards the torch exit, the plasma fireball can easily contact a substrate tube 102.

Parameters of a silica preform affecting its surface temperatures include its thermal capacity, thermal conductivity, emissivity, and heat of vaporization. Other parameters affecting the preform surface temperature are the energy being supplied to the plasma, and the plasma gas composition. In addition, torch apparatus and configuration can affect the deposition rate within the preform. Such apparatus related parameters include torch design, torch to preform separation, torch to preform orientation (e.g., plasma above or below the preform, as later discussed), and plasma torch surroundings (i.e., muffling). For example, the fused quartz extension 518 of the torch body is used to prevent the plasma fireball or hot discharge gas from contacting the RF coil 512 which could alter its electrical characteristics, which, in turn, could randomly alter the plasma location.

The method of the invention is preferably practiced without actively pushing (as previously described in the embodiments using a second gas) the plasma fireball out of the confinement region. The plasma center remains in the confinement region substantially removed from the plasma torch exit, and the overall plasma fireball size can be enlarged by operating at high power, allowing the plasma fireball to extend outside the torch. Furthermore, it is believed that locating a substantial portion of the plasma fireball outside the torch can also be attained by a relatively high flow rate of the discharge gas. FIG. 5 schematically shows the inventive method being practiced with the fireball above the substrate tube. The method can also be practiced with the heat source 104 and the substrate tube 102 inverted while mounted to holding apparatus. Alternatively, a two torch configuration can be used such that both sides of the substrate tube are simultaneously heated. The currently preferred embodiment uses the configuration with the fireball below the substrate tube. Other examples for adjusting the location of the fireball are described in the '771 patent.

Typically, in the configurations discussed above, the torch and substrate tube surface are separated by more than 100 mm, preferably from 40–60 mm. Temperature of the tube can be changed by adjusting the flow of oxygen to the torch, mixing other gases with the $O_2$ adjusting the radio frequency energy to the plasma or adjusting position of the torch relative to the substrate tube.

Alternatively, the torch used in the method of the invention can be automatically vertically adjusted and tilted such that the fireball can be placed in various positions with respect to the substrate tube. For example, the plasma torch can be similar in size to standard torches having a confinement region typically between 30 to 60 mm in diameter.

Gas flow rates into the hydrogen-free plasma torch with either $O_2$ or $O_2$/Ar as the currently preferred gas, generally range from 1 to 100 l/min. For embodiments using a high ionization threshold gas to push the plasma out of the confinement region, $N_2$ is typically used as the high ionization threshold gas, with a flow rate generally ranging from 1 to 40 l/min, though other high ionization threshold gases, such as He, can also be used. The high ionization threshold gas generally must have a higher energy threshold for ionization than the discharge gas.

The plasma fireball, excited by a RF generator 514 that typically provides output power between 20 and 40 kW, for example 30 kW, traverses a preform at speeds typically from 0.01 to 100 cm/sec covering about 1 meter of the preform being processed. Generally, the preform is rotated between 0.1 and 200 rpm, inclusively.

The hydrogen-free plasma torch can also be used for collapsing the tube after the glassy deposit is produced. The glass precursor reactant vapors can be maintained in the tube during the collapsing step.

In a further embodiment, an RF (radio frequency) furnace can be used in place of the isothermal plasma. The use of an RF furnace in a substantially hydrogen-free atmosphere can achieve the desired results discussed above in connection with the plasma torch. RF furnaces currently used to draw fibers can be used to make preforms according to the present invention.

While various embodiments of the present invention have been described above, it should be understood that they have been presented by way of example, and not limitation. It will be apparent to persons skilled in the relevant art that various changes in form and detail may be made therein without departing from the spirit and scope of the invention. Thus, the present invention should not be limited by any of the above-described exemplary embodiments, but should be defined only in accordance with the following claims and their equivalents. All cited patent documents and publications in the above description are incorporated herein by reference.

What is claimed is:

1. An optical fiber substantially free of OH impurities, capable of transmitting an optical signal without loss due to sub-harmonic interference by OH absorption, wherein said optical fiber is drawn from a glass preform produced according to the following modified chemical vapor deposition method:

introducing a moving stream of vapor mixture including at least one glass-forming precursor and an oxidizing medium into a tube; and heating the tube with a substantially hydrogen-free heat source, whereby the mixture reacts and a glassy deposit is produced on an inner surface of the tube.

2. An optical fiber communication system comprising:

a transmitter;

a receiver; and the optical fiber of claim 1 for communicating an optical signal between said transmitter and said receiver, said optical fiber permitting transmission of the optical signal without loss due to sub-harmonic interference by OH absorption.

3. The optical fiber communication system of claim 2, wherein said transmission optical fiber can operate in the 945, 1240, and 1385 nanometer wavelengths ranges with minimal sub-harmonic interference by OH absorption.

4. The optical fiber communication system according to claim 2, wherein said glass preform is produced by a modified chemical vapor deposition method comprising the steps of:

introducing a moving stream of vapor mixture including at least one compound glass-forming precursor and an oxidizing medium into a tube; and heating the tube with a substantially hydrogen-free heat source, whereby the mixture reacts and a glassy deposit is produced on an inner surface of the robe.

5. The fiber of claim 1, wherein said substantially hydrogen-free heat source is an isothermal heat source.

6. The fiber of claim 5, wherein said isothermal heat source is an oxygen plasma heat source.

7. The fiber of claim 5, wherein said isothermal heat source is an oxygen/argon plasma heat source.

8. The fiber of claim 1, wherein said optical fiber can operate in the 945, 1240, and 1385 nanometer wavelengths ranges, with minimal sub-harmonic interference by OH absorption.

9. The fiber of claim 1, wherein the heat source is a radio frequency furnace.

* * * * *